United States Patent
Keller et al.

[15] 3,686,628
[45] Aug. 22, 1972

[54] VEHICLE SPEED REGULATION, CONTROL MEANS, AND WARNING SYSTEM

[72] Inventors: Arthur E. Keller, 8937 Carla Dr., Indianapolis, Ind. 46219; Claude W. Earles, 1013 E. Buchanan St., Plainfield, Ind. 46168

[22] Filed: Dec. 29, 1969
[21] Appl. No.: 888,598

[52] U.S. Cl. .................... 340/53, 340/62, 340/224, 325/64, 325/312, 180/106
[51] Int. Cl. ............................................. B60q 1/54
[58] Field of Search............340/27, 53, 62, 263, 224; 325/64, 312; 180/103, 105, 106, 109

[56] References Cited

UNITED STATES PATENTS

| | | | |
|---|---|---|---|
| 3,229,249 | 1/1966 | Brenner | 340/62 X |
| 3,195,671 | 7/1965 | Wolfe, Sr. | 340/53 X |
| 3,017,946 | 1/1962 | Davis et al. | 340/53 X |
| 3,438,031 | 4/1969 | Fathauer | 340/263 X |

*Primary Examiner*—Alvin H. Waring
*Attorney*—Robert A. Spray

[57] ABSTRACT

A vehicle speed regulation and control system, utilizing radio signals from highway transmitters, which provides an indication to the vehicle driver of the speed limit along that portion of the highway, and provides other psychological controls and indications relating to vehicle speed.

29 Claims, 4 Drawing Figures

Patented Aug. 22, 1972
3,686,628
3 Sheets-Sheet 1
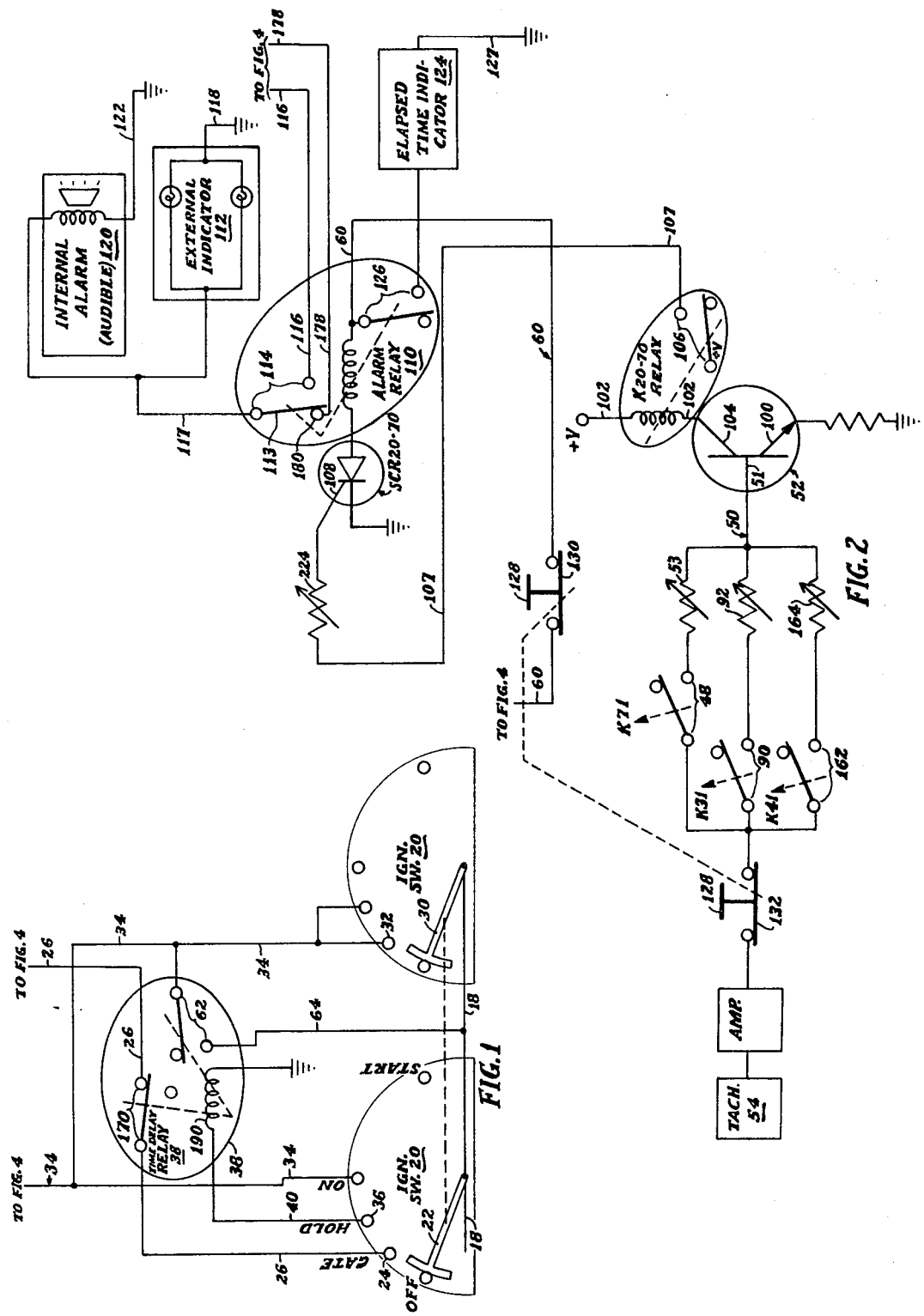

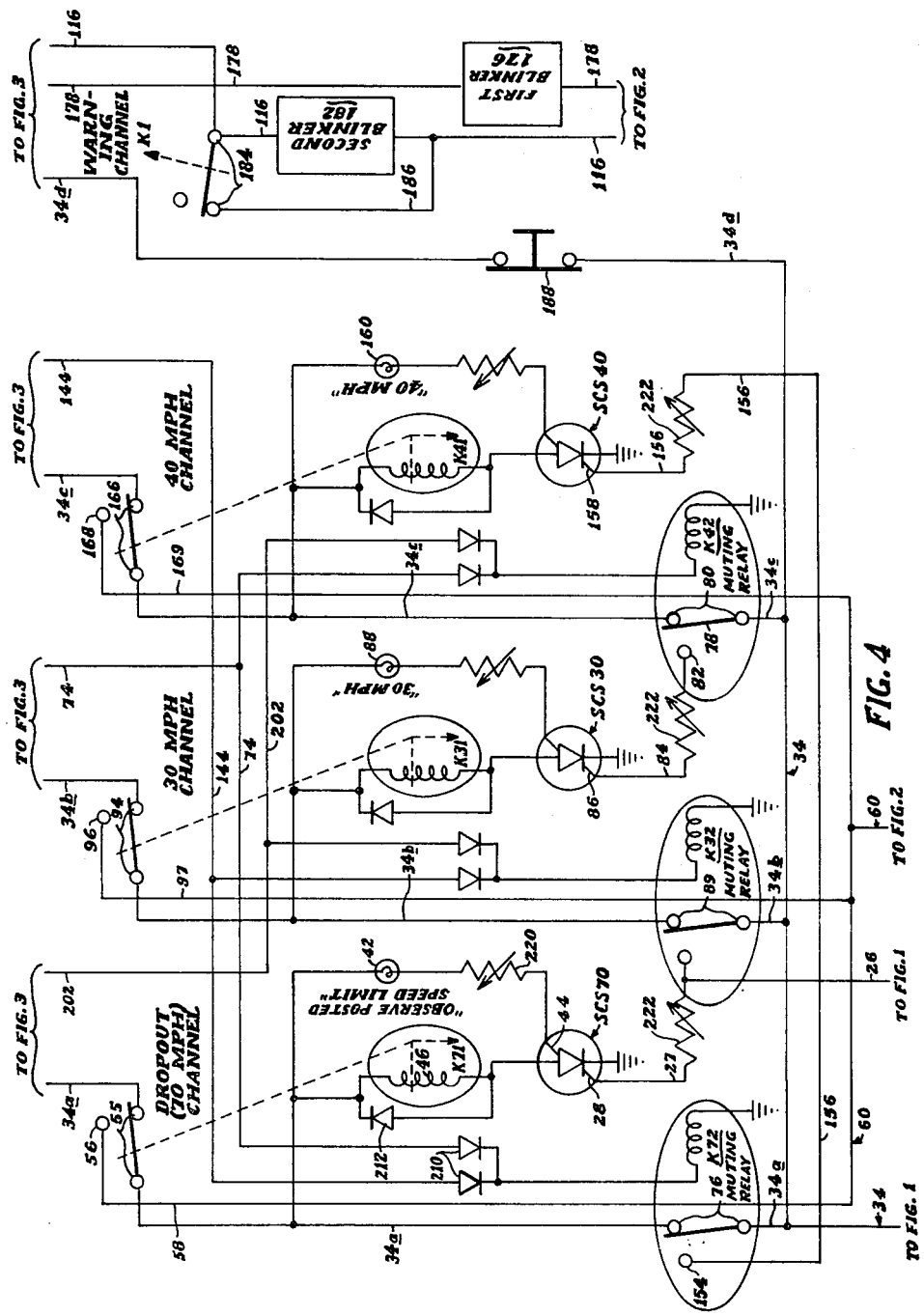

VEHICLE SPEED REGULATION, CONTROL MEANS, AND WARNING SYSTEM

This invention relates to a system for vehicle speed regulation and control. That is, the concepts provide an automatic speed alert system, of what might be termed a psychological speed control nature, which instantly alerts a vehicle driver that he is over the legal speed limit, even though the speed limit may frequently change. Thus, it helps the person who wants to stay within the speed limit, and immediately exposes the driver who disregards the speed limit intentionally or unintentionally. If desired it could be integrated into an automatic control system.

The system according to the inventive concepts consists of two general parts, one part being with the vehicle, and the other part being a series of transmitter devices strategically located along the streets or highways, each of those devices transmitting a signal according to the speed limit of the particular zone. The part with the vehicle is initially activated by the transmitter devices, and, from then on, everything is automatic in the embodiment herein set forth, providing the warnings, indications, and other effects detailed herein.

The part or system in the vehicle is divided into several different channels, each channel representing a different speed zone. That is, for example, there is a 30 MPH channel, a 40 MPH channel, etc., according to how refined the speed-control is to be. A very significant feature is that the inventive concepts provide that the system changes channels automatically as the vehicle enters different speed zones, no matter how often the zones change. As the system changes channels, it is immediately locked up on that channel, and will remain there until a new speed zone is entered. One of the operational effects is that an indicator light on the dashboard inside the vehicle tells the driver which speed zone he is in. Moreover, an audible or other alarm on the vehicle interior alarms or warns the driver that he is speeding; and an external indicator on the outside of the vehicle informs others, including the traffic control authorities.

The only way these alarms or indicators can be extinguished is by applying a slight pressure to the brakes; and thus the driver is instantly and automatically coerced into reducing his speed, and it will hopefully become a conditioned response for him.

In addition to the regular speed zone channels, the concepts of the system of this embodiment provide two additional channels. One is a warning channel which overides all channels, and the other is a system dropout channel for areas that are not controlled, as further detailed below.

If the warning channel is activated, concepts provide that the external indicator will go into an attention-getting flashing condition. When the system dropout channel is activated, an indicator light on the dashboard will signal the driver, as "OBSERVE POSTED SPEED LIMIT."

Other concepts features of the system are a holding circuit incorporating a time delay, which circuit is operated or energized by turning the vehicle's ignition key, and an elapsed time indicator to register the amount of time the vehicle is in a speeding condition. The holding circuit prevents the driver from turning off the ignition key to disable the system; yet it also allows the driver to stop the vehicle, turn it off for a length of time, restart the vehicle, and still be on the same channel. The elapsed time indicator, which is automatically turned on every time the vehicle is in a speeding condition, can then be used for various control purposes, desirably with a relationship consideration of the actual amount of miles driven; and the analysis or comparisons would be useful for insurance companies, governmental regulatory agencies, and other control agencies such as the driver's parents, the vehicle's owner, etc.

The above is rather generalized, being of a rather introductory nature; and the above and other concepts and features of the invention will appear in the following more detailed description of an embodiment illustrative of the inventive concepts, reference being had to the accompanying somewhat diagrammatic drawings, in which:

FIG. 1 is a schematic view of a portion of the components carried by a vehicle, this view being generally of the ignition switch and a time delay relay, and adjacent portions of the circuitry;

FIG. 2 is a schematic view of a portion of the vehicle-carried components, primarily the speed-responsive and control - responsive means, and associated control components including alarms and indicators, and associated circuitry;

FIG. 4 is a schematic view of other portions of the vehicle-carried components, responsive to control by external signals but in turn controlling other means.

Figure 3:
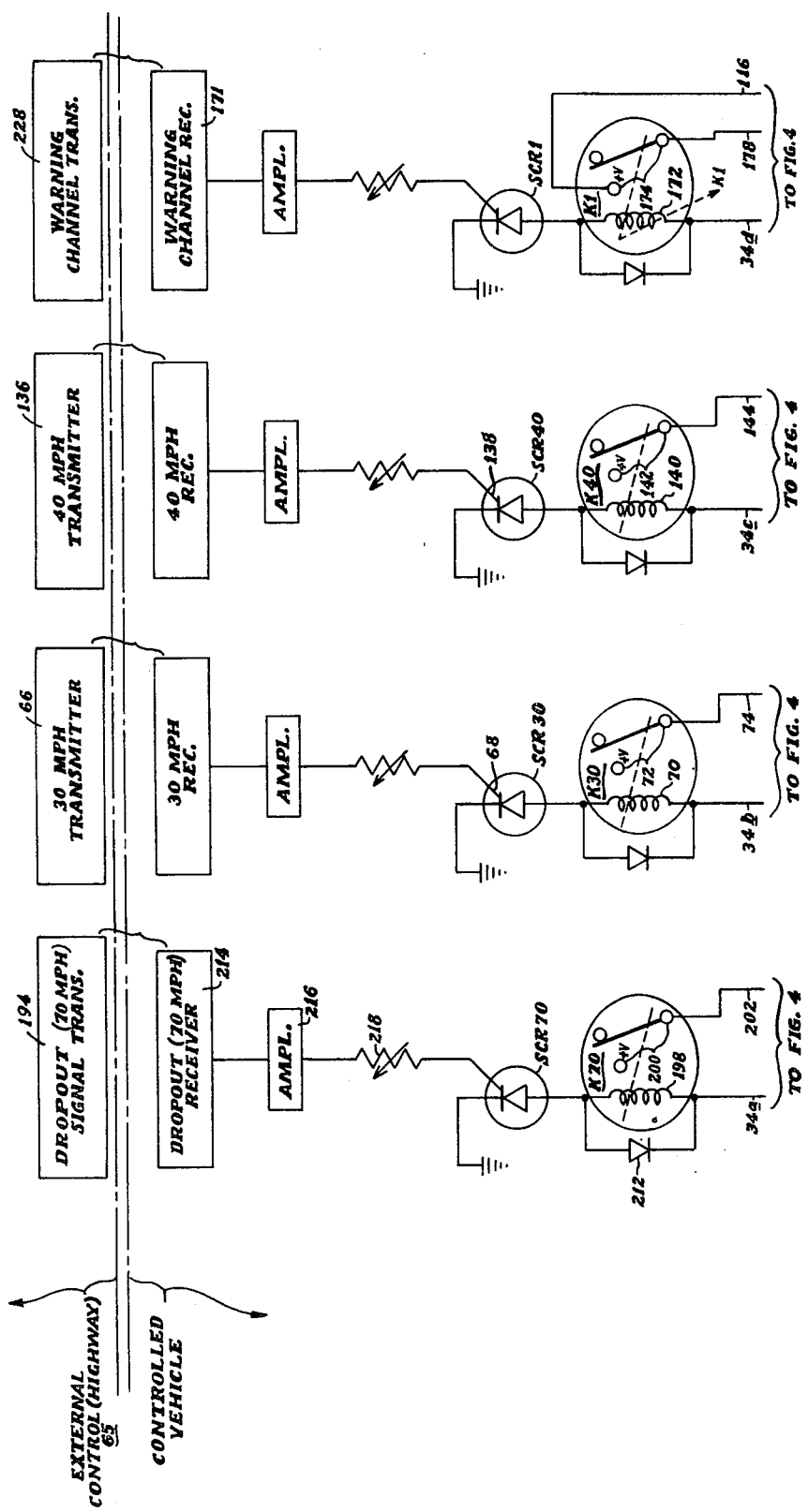
FIG. 3 is a schematic view of the highway or other external signal means, and portions of the vehicle-carried sensing means and certain of the control means relatively directly responsive to the external signal means.

(There is a considerable inter-action and inter-relationship between the components shown in the several views; and thus the above general descriptions of those views must be realized to be somewhat over-simplified for introductory brevity.)

The overall speed alert or control system shown in the drawings will now be described in detail; and for the goal of both overall brevity and of the understanding of the operational effect and achievement of the various concepts and features, the parts will be described generally in the setting of their functional operativity. (Battery voltage of 12 V will be assumed, supplying power from a supply line 18.)

I. Initial Turning the Ignition Key to the "ON" Position

The ignition switch 20 is shown as a three-position shorting switch, having "Off," "On," and "Start" positions, but also having two intermediate contacts, so that as the wiper blade 22 is turned to the "On" position, it passes through those intermediate contacts as follows: As it passes the first intermediate contact 24, a line 26 leading from contact 24 applies a gate signal through gate circuit 27 to the cathode gate 28 of a Silicon Control Switch SCS–70, in the Dropout Channel explained herein; and 12 V is applied to the complete system, momentarily, by ignition wiper blade 30 acting through its corresponding intermediate contact 32 and a branch of a main supply line 34. As ignition blade 22 passes through the second intermediate contact 36, a Holding Relay 38 is energized by line 40. (Line 34 has branches $a, b, c, d$.)

When Switch SCS–70 is gated and turned on by current flow through gate 28, the current from line 34a causes the "OBSERVE POSTED SPEED LIMIT" light 42 to turn on with current flow in the anode gate 44 of SCS–70; and the current in line 34a also flows through the coil 46 of a Relay K–71, causing it to be energized. As relay K–71 is energized, there is closed one set of contacts 48 (FIG. 2) in one of the parallel branches of a circuit 50 which leads to the base 51 of a NPN-Transistor 52. In this branch of Transistor Base Circuit 50 there is a "70 MPH" Calibrating Resistor 53; and the transistor circuitry is placed, by the said closure of the contacts 48, in a state of readiness ready to receive an energizing signal from a Tachometer 54 for speed alarm effects described below if vehicle speed is over the prescribed limit.

The other set of contacts 55 (FIG. 4) of K–71, in line 34a, will open, and will thus remove the 12 V from a Silicon Control Rectifier SCR–70, and through contact 56, apply 12 V from line 34 through line 58 to the Alarm Circuit 60.

When the Holding Relay 38 (Time Delay Relay) is energized during the ignition turn-on, it acts to close the contacts 62 in a line 64 connecting the hot (circuit 18) side of the ignition-switch to the line 34, thus applying 12 V to the system for a predetermined length of time, until the Holding Relay times down to re-open the contacts 62. This Circuit 64 is used to keep 12 V applied to the system, as the key (not shown) is turned to the "Start" position. When the key returns to the "On" position, the 12 V will be supplied through the wiper blade 22 of the ignition switch.

II. Changing Channels as Initial Highway Signal is Received (Illustrated Here as Reception of a Signal of the 30 MPH Channel)

A. Signal Pick Up: (From Highway 65)

As the vehicle picks up a signal from the 30 MPH Transmitter Device 66 (FIG. 3), a Silicon Control Rectifier SCR–30 is gated and turned on by current flow through gate 68 thereof. When Rectifier SCR–30 is turned on, the circuit established between line 34b and ground provides that current flow through it flows through the coil 70 of a Relay K–30 in that circuit, that coil's energization closing the relay contacts 72, thus applying a voltage through a line 74 to the Muting Relays of all channels other than the 30 MPH channel. (Those other Muting Relays are shown as K72 and K42 in this illustrative embodiment.)

This energization of all those other Muting Relays (K72 and K42) will be seen to break the circuit in all of the other branches (34a and 34c) of the circuit 34, as illustrated below, to all numerically controlled Channels except the 30 MPH channel; and thus, although the gate of those other channels' SCS Switch would be energized (here, for example, it will be seen from the drawings that the gate circuit of Switch SCS–40 would be energized by the following-described actuation of Muting Relay K72), there would be no power from line 34 to energize the other control relays (K41 or K71 in this embodiment, considering this 30 MPH illustration). Thus the signal picked up from the 30 MPH Transmitter 66 prevents control by any numerical channel except the 30 MPH channel.

B. Channel Turn Off

As the K72 Muting Relay is energized, the opening of contacts 76 of line 34a causes 12 V to be removed from Switch SCS–70 in the Dropout (the 70 MPH) Channel, turning off the "OBSERVE POSTED SPEED LIMIT" Light 42. The de-energization of coil 46 of Relay K71 causes the Relay contacts 48 of Relay K71 in the Transistor Base Circuit 50 to open, removing the 70 MPH Calibrating Resistor 53; and the movement of the contact blade of switch 55 off the contact 56 causes battery voltage to be removed from line 58 and thus also from the Alarm Circuit 60, and applied to Rectifier SCR–70; although SCR–70 will remain in the blocked condition until another signal is received to cause gate current to flow, with effects explained below.

C. Channel Turn On

Each channel is turned on by the Muting Relay in the channel next to it. For example, as K42 Muting Relay of the 40 MPH channel is energized, it will move a contact blade 78 of contacts 80 (which correspond to the contacts 76 opened by Muting Relay K72 as above described), and apply battery voltage from line 34c to a gate circuit contact 82 in a gate circuit 84, thus applying voltage to the cathode gate 86 of Switch SCS–30, in the 30 MPH channel. When Switch SCS–30 is turned on, the 30 MPH indicator light 88 will come on, and Relay K–31 will be energized, it being recalled that in the present illustration the Muting Relay K32 of the 30 MPH channel has not been energized, and thus the line voltage of line 34b is not broken by the switch contacts 89 associated with the Muting Relay K32.

As Relay K31 is energized, a set of contacts 90 in the base 50 of the Transistor Circuit will close, and place the 30 MPH Calibrating Resistor 92 in the base Circuit 50. The other set of contacts 94, which are controlled by Relay K31, will open, and remove the 12 V from Rectifier SCR–30, and this in turn de-energizes coil 70, opening contacts 72 of Relay K30, de-energizing line 74 and thus de-energizing all of the Muting Relays; but the blade of contacts 94 is moved by Relay K31 to the contact 96 of line 97 to energize the Alarm Circuit 60 with battery voltage in supply line 34, by the branch 34b of the parallel power supply branches 34a, 34b, 34c, and 34d in this illustrative embodiment.

C1. If the Vehicle is Within Speed Limit (30 MPH in This Illustration)

If the vehicle speed is under 30 MPH, plus whatever allowable tolerance over that speed has been set, nothing more will happen, for the below-described components are not actuated. The signal from the roadway has in a sense merely made things ready for subsequent alarm or control steps, if and when the vehicle exceeds that speed.

C2. If the Vehicle is Over the Speed Limit

If the vehicle speed gets over 30 MPH (plus the allowable tolerance), the circuitry of the signal from the Tachometer 54, and the branch line of Transistor Base Circuit 50 containing closed contacts 90 and the 30 MPH Resistor 92, establishes a control circuit through the Transistor Base 51 and Emitter 100; and the controlled Transistor Circuit 102 through Collector 104 will go into full conduction, and will energize Relay K20–70. When Relay K20–70 is energized, contacts 106 close, and by line 107 voltage will be thus applied to the Gate 108 of a Rectifier SCR 20–70, causing it to fire, establishing a circuit involving Alarm Circuit 60, and energize the Alarm Relay 110. (It will be recalled that the Alarm Circuit 60 has already been energized, in this operational example, as described above.)

C3. Effects of Energization of Alarm Relay 110

When the Alarm Relay 110 is energized, three things will happen: (a) An External Indicator 112 will turn ON, by movement of a contact blade 113 (controlled by Relay 110) to effect a closure of contacts 114 which connect a power circuit 116 to circuit 117 leading to a ground line 118; and (b) an Interior Alarm (audible) 120 will come ON, by power from circuit 116 through blade 113, those closed contacts 114, circuit 117, and a ground line 122; and (c) an Elapsed Time Indicator 124 will come ON, by closure of contacts 126 which connect the Elapsed Time Indicator 124 between the Alarm Circuit 60 and ground line 127.

C4. Muting the Alarms and Indicators

The only way the said Alarms and Indicators (112, 120, 124) can be muted is by applying a slight pressure to the Brake Pedal 128. This removes the 12 V from Rectifier SCR 20–70, by opening a switch 130 in the alarm circuit 60, returning SCR 20–70 to a blocked condition, causing the Alarm Relay 110 to de-energize. Depression of Brake Pedal 128 also opens a switch 132 thus removing the output of the Tachometer from the Transistor Base Circuit 50; and this opening of Transistor Base Circuit 50 causes the controlled Transistor Circuit 102 to drop to minimal conduction, and thus causing Relay K20–70 to de-energize.

If the vehicle is still speeding when the Brake Pedal 128 is released, the said Alarms and Indicators (112, 120, and 124) will come ON again, for reasons explained above, there being no prolonged circuit-breaking effect of a released depression of the Brake Pedal 128.

If, however, the vehicle speed has been lowered to below the control speed when the Brake Pedal 128 is released, the said Alarms and Indicators (112, 120, and 124) will not come ON: for the tachometer-controlled Transistor Base Circuit 50 will not be energized to cause the controlled circuit 102 of the Transistor 52 to energize Relay K20–70 and Alarm Relay 110.

III. A Change of Highway Signal is Received: (Illustrated Here as Reception of a Signal of the 40 MPH Channel)

A. 40 MPH Signal Pick Up

As the vehicle moves now into a 40 MPH zone, similarly to the actuation described above, it will pick up a signal from the 40 MPH Transmitter Device 136 (FIG. 3); and current in gate 138 fires a Silicon Control Rectifier SCR–40. (It will be recalled that the earlier described movement of blade 78 of power branch 34c which movement opens the contacts 80, as caused by the prior mentioned energization of Muting Relay K42, had only been momentary; for the same energization, which has energized Relay K30 to in turn energize the Muting Relay K42, had also energized Relay K31 to open the contacts 94 in the power branch 34b to immediately de-energize Relay K30 and thus also de-energize the Muting Relay 42, thus causing blade 78 to re-close the contacts 80 and thus make its circuit-portion 34c of power circuit 34 ready for firing the Rectifier SCR–40 upon receiving from the highway a gate signal at 138.)

When SCR–40 is turned on, Relay K40 will be energized by current in line 34c flowing through coil 140; and the closure of contacts 142 of Relay K40 energizes circuit 144 which, similarly to the energization of circuit 74 as described above, applies a voltage to the Muting Relays (K72 and K32) of all other channels. This will be seen to break the 12 V line 34 to all channels except the 40 MPH channel, by opening of line 34 contacts (76 and 89) respectively controlled by those other Muting Relays, similarly to the circuit-breaking opening of contacts 76 as described above.

B. 30 MPH Channel Turn Off

As K–32 Muting Relay is energized, it opens the contacts 89, similarly to the opening of contacts 76 above described, opening circuit 34b; and thus battery voltage will be removed from SCS–30 in the 30 MPH channel, turning off the 30 MPH Indicator Light 88. The contacts 90 of K–31 in the Transistor Base Circuit 50 will open, removing the 30 MPH Calibrating Resistor 92; and, by the moving of the contact arm of switch 94 from contact 96 (by de-energization of Relay K31), the 12 V will be removed from the Alarm Circuit 60, and by closure of contacts 94 applied to Rectifier SCR–30, with SCR–30 remaining in the ready or blocking position until another signal is received.

C. 40 MPH Channel Turn On

As K–72 Muting Relay is energized, by circuit 144 in this illustration of a highway signal received from Transmitter 136 in the 40 MPH channel, it will move the contact blade 76 in the power branch line 34a (similarly to movement of contact blade 78 of line 34c in the earlier 30 MPH control illustration) to a contact 154 in a circuit 156 leading to a gate 158 of Switch SCS–40 in the 40 MPH channel, energizing that gate 158 by power branch 34a. And with the energization of that gate 158, the Switch SCS–40 is turned ON, permitting power branch 34c to cause the 40 MPH Indicator Light 160 to turn ON, and Relay K–41 will be energized. (The Light 160 is shown in an anode gate circuit of Switch SCS 40, similarly to the circuitry of Lights 42 and 88 mentioned above.)

Similarly to the above illustrations, the energization of Relay K–41 closes one set of contacts 162 in the Transistor Base Circuit 50, placing a 40 MPH Calibrating Resistor 164 in the Base Circuit 50. In power branch 34c, the other set of contacts 166 controlled by the Relay K41 will open, and will remove the 12 V of line 34c from Rectifier SCR–40, opening contacts 142 and thus de-energizing all of the Muting Relays by opening the circuit 144; and the contact blade for contacts 166 moves to the contact 168 in line 169, and applies 12 V from line 34c to the Alarm Circuit 60.

C1. If the Vehicle is Within Speed Limit: (40 MPH Illustration)

If the vehicle speed is under 40 MPH, plus whatever allowable tolerance over that speed has been set, nothing more will happen, for the speed-controlled energization of the Transistor Base Circuit 50 has not been established, as per description already given.

C2. If the Vehicle is Over Speed Limit

If the vehicle speed is over 40 MPH (plus the allowable tolerance), the Transistor Circuit 102 will go into full conduction; and the Alarm Relay 110 will be activated, energizing the Alarms and Indicators (112, 120, and 124) as above described.

D. Vehicle Speeding When Moving from 30 MPH Zone into 40 MPH Zone

If the vehicle is speeding (Alarm Relay 110 and said controlled Alarms and Indicators are ON) when moving from a 30 MPH Zone into a 40 MPH zone, the speed of the vehicle will determine what takes place, as follows:

If the vehicle is over 40 MPH (plus the allowable tolerance) the Alarm Relay 110 will extinguish for a few milliseconds, but then come right back ON. This will be of negligible significance, for it will happen so fast that it will hardly be noticed. This is caused by the Alarm Circuit 60 being switched from the 30 MPH channel to the 40 MPH channel, that is, from Relay Contacts of K31 to Relay Contacts of K41.

If, however, the vehicle is below 40 MPH (plus the allowable tolerance) when entering the 40 MPH Speed Zone, the Alarm Relay 110 will extinguish automatically. This is accomplished during the changing of the 30 MPH Calibrating Resistor 92 and the 40 MPH Calibrating Resistor 164, as follows:

As Channel 30 is turned off, the set of contacts 90 controlled by Relay K31 opens and removes the 30 MPH Calibrating Resistor 92 from its branch of the Transistor Base Circuit 50. At this time, Relay K20–70 in the Transistor Circuit 102 will de-energize because the Transistor 52 will have no base drive. And even when Relay K41 in channel 40 is energized, and even though its closure of contacts 162 inserts the 40 MPH Calibrating Resistor 164 into the Transistor Base Circuit 50, Relay K20–70 will nevertheless remain de-energized, due to an insufficient amount of base drive, for it is responsive to the Tachometer 54, and the vehicle speed is too low in comparison to the setting of the 40 MPH calibrating Resistor 164. Relay K20–70 will remain de-energized until the vehicle gets over the 40 MPH Speed Limit, assuming of course that no highway signal less than a 40 MPH control signal is received.

IV. Holding Circuit 40

The Holding Circuit 40 is operated through the ignition switch 20. This Holding Circuit 40 is used when turning the system "On," and also when turning the system "Off."

(In illustrating the operativity of the Holding Circuit, it will be assumed that the system is locked up on the 40 MPH channel.)

Assume that the Ignition Key (not shown) is being turned from the "On" to the "Off" position. As it is turned to the "Off" position, it passes two contacts. The first contact 36 encountered is that of the Holding Circuit 40, which includes the Time Delay Relay 38. The second contact 24 encountered is that of the Gate Circuit 26 of Switch SCS 70.

As the Ignition Wiper Blade 22 passes the first contact 36, in turning the ignition from "On" to "Off," it energizes Holding Circuit 40 and applies a momentary voltage to the Time Delay Relay 38, causing it to energize. The Time Delay Relay 38 will stay energized for a predetermined amount of time, and then de-energize.

While the Time Delay Relay 38 is energized, 12V will be applied to the system from line 18 through one set of its relay-controlled contacts 62 and lines 64 and 34.

In further movement toward the "Off" position, as the Wiper 22 passes through the second contact 24 nothing will happen, because the Gate Lead 27 will have been opened by excitation of the Time Delay Relay 38, opening its controlled contacts 170 in the Gate Circuitry 26–27. (More detailed effects of the Time Delay Relay 38 are discussed hereinafter.)

The system is now locked onto the 40 MPH channel until the Time Delay Relay 38 times down. The vehicle can be re-started before the Holding Circuit 40 times down, and still be on the 40 MPH channel.

Once the Time Delay Relay 38 times down, the system will be on the Dropout Channel when the vehicle is subsequently re-started.

V. Warning Channel

The Warning Channel overrides all other Channels, whether the vehicle is in a speeding or non-speeding condition. This Warning Channel can be activated from Transmitter Devices located at the roadside, or by other means such as police patrol cars, fire engines, or any emergency type vehicle. For example, it can particularly be used along the streets or highways, to alert the driver that he is entering a hazardous area or a high accident area. Moreover, it can be activated from police patrol cars to alert the driver that he is approaching the area of an accident. A police patrol car can also turn "On" this channel for the purpose of checking to see that the external indicators 112 are operating properly, and have not been removed or otherwise disabled. This would serve as a deterrent to the driver who might remove the external indicators to avoid control by the system.

The actuation of the Warning Channel is as follows: A signal is received by a Warning Receiver 171 of the Warning Channel; and Silicon Control Rectifier SCR–1 is thus gated, permitting current in line 34d to energize the coil 172, causing Warning Channel Relay K1 to be energized, and closing the relay-controlled contacts 174. As now discussed, the speed of the vehicle will determine what takes place when Warning Channel Relay K1 is energized.

If the vehicle is within the Speed Limit, a First Blinker 176 in a line 178 will be connected to the External Indicator 112 on the outside of vehicle and the Interior Alarm (Audible) 120 inside the vehicle, causing both to be in an attention-getting or blinking condition. (Being under or within the set speed limit, the blade 113 which in an overspeed situation connects contacts 114 of the alarm-indicator circuit 116–117 is in its FIG. 2 position which through a contact 180 interconnects power line 178 with the alarm and indicator line 117.)

If the vehicle is over the Speed Limit (External Indicator 112 and Interior Alarm 120 ON) a Second Blinker 182 will be connected to the External Indicator 112 and the Interior Audible Alarm 120, causing them to go into a blinking condition; for contacts 114 (through blade 113) will be closed by the overspeed excitation of the Alarm Relay 110, and the opening of contacts 184 (controlled by excitation of Relay K1) opens the shunt circuit 186 which permits line 116 to otherwise bypass the Second Flasher 182.

This Warning Channel may be muted by the driver by a Switch 188, conveniently mounted on the vehicle dashboard, which when opened opens the branch 34d of power circuit 34 connected to the coil 172 which energizes the Warning Channel Relay K1. The Switch 188 is of a normally closed typed, of suitable spring-loaded nature. If the vehicle is still in the danger area, when the Warning Mute Switch 188 is released, the Indicator 112 and the Alarm 120 will come back ON, still flashing. If, however, the vehicle is out of the danger area, when the Mute Switch 188 is released, those signals 112 and 120 will remain OFF, for coil 172 will have been de-energized, re-opening contacts 174 and re-establishing contacts 184 to close the shunt circuit 186 around the Second Blinker 182. (This re-opening of relay contacts 174 removes Warning Channel power in line 178, which line energizes the Warning Channel in a within-speed-limit situation; and the re-closing of shunt line 186 prevents actuation of the Second Blinker 182 when the vehicle is in an over-speed-limit situation, that being the only situation in which circuit 116 is closed to its branch circuit 117 by the alarm relay-controlled contact blade 113 closing the contacts 114.)

VI. Time Delay Relay 38 Operatively in Holding Circuit (Ignition Turn On)

Voltage to the system is normally supplied through the Ignition Switch Wiper 22 when the ignition key is in the "On" position. In starting the engine, as the Ignition Switch 20 is turned away from the "On" position to the "Start" position, the Time Delay Relay 38 provides a means for momentarily keeping voltage supplied to the system, even though the Ignition Wiper 22 is off the contact connected to main power supply circuit 34.

The Time Delay Relay 38, as described previously, has two sets of contacts (62 and 170); and these are energized by an energizing coil 190. The set of contacts 170 is in the gate circuit 26–27 to Switch SCS–70, and the other set of contacts 62 is in line 64, bypassing the Ignition Switch Wiper Blades (22 and 30), in connecting power source line 18 to the main supply line 34. The energizing coil 190 of Relay 38 is in the Holding Circuit 40.

As Ignition Switch Wiper 22 makes contact with the gate contact 24, battery voltage of line 18 is applied to the gate 28 of Switch SCS–70 via contacts 170 of the Time Delay Relay 38. Wiper 30 simultaneously applies voltage from supply line 18 to the main supply line 34 via ignition contact 32.

As Wiper 22 makes contact with the Holding Circuit contact 36, the Time Delay Relay Coil 190 is energized, causing contacts 62 to be closed, thereby applying battery voltage to the main supply line 34 by connection of power circuits 64 and 18 to the supply line 34 independently of the Ignition Blades 22 or 30 and their contacts. This keeps voltage of line 18 supplied to the system while the ignition switch is turned to the "Start" position.

(Contacts 170 in the gate circuit 26 are also opened at this time, by the Relay 38; however, the opening of this set of contacts 170 is not important at this time, as is more apparent in the description below, relating to Ignition Turn-Off.)

After the vehicle is started, means (not shown) will provide that the Ignition Switch Wiper 22 will return to the "On" position. Main supply line 34 voltage from line 18 will now be supplied to the system through the Ignition Switch Wiper 22. The line 18 voltage will, until the Time Delay Relay 38 times down, also be supplied to Supply Line 34 through the circuit 64 and the temporarily-closed relay contacts 62, the latter circuitry in this stage merely serving as a parallel supply, temporarily. Then, after a pre-determined amount of time (the time-duration for which the Time Delay Relay 38 is set), the Time Delay Relay 38 will time down, and relay contacts 62 will return to their normal or open position; and Main Supply Line 34 voltage will then be supplied through the Ignition Switch Wiper 22 only.

VII. Time Delay Relay 38 Operativity in Holding Circuit Ignition Turn-Off)

(Assume the system is locked up on 40 MPH channel.)

The Time Delay Relay 38 provides a means which prevents the operator from disabling the locked-on signal channel (the 40 MPH channel in this illustration) by turning off the ignition switch 20 momentarily, as now-explained.

As the operator would turn the ignition switch 20 toward the "Off" position, the Ignition Wiper Blade 22 is broad enough (being of a shorting type) that it contacts the Holding Circuit contact 36 prior to leaving its "On" contact. As the Ignition Switch Wiper 22 makes contact with the Holding Circuit contact 36, the coil 190 of the Time Delay Relay 38 will be energized, causing contacts 62 to be closed, thereby applying voltage of line 18 through circuit 64 to the main supply line 34. This maintains energization of the Relay K–41 (it being assumed in this illustration that the system has been in effect locked onto the 40 MPH channel) throughout the length of time for which the Time Delay Relay 38 is set.

Gate circuit contacts 170 will also be opened when the coil 190 of Time Delay Relay 38 is energized. This opens the gate circuit (26–27) to Switch SCS–70 in the Dropout Channel, preventing the Dropout Channel from turning on concurrently with the 40 MPH channel of the illustration, when the Ignition Wiper 22 makes contact with gate contact 24 in the continuing movement of Wiper Blade 22 toward the "Off" position. (If the gate circuit 26 had remained closed during this stage, the 40 MPH channel (or whatever other channel happened to be then locked in) and the Dropout Channel would both be "On" at the same time.) Contacts 62 will remain closed, and contacts 170 will remain open, until the Time Delay Relay 38 times down. With the contacts 170 still open, the vehicle can be re-started, but still be on the 40 MPH channel only.

VIII. Dropout Channel Details

The Dropout Channel provides function and advantages having significance which is probably best appreciated by first considering the variations in highway conditions often encountered. For example, some highway areas would probably not need to be controlled, and some areas may be considered as not justifying the expense of control; and numerical speed-limit control for some areas may for whatever reason not even be considered practical. Thus the Dropout Channel provides for such regions a warning of some kind. Moreover, the Dropout Channel provides some kind of warning when the vehicle is first started. Further, for example, for certain highways, particularly the highways of the "Interstate Highway" system, their particular factors provide particular considerations, as mentioned below.

A. Uncontrolled Highway Areas

When the Dropout Channel is turned "On," an indicator light 42 on the dashboard simply tells the driver to "OBSERVE THE POSTED SPEED LIMIT." One manner of this Channel coming "On" is at the time when the driver starts the vehicle; for as shown above, this Dropout Channel is turned on, automatically, via the ignition key (unless the Holding Relay 38 is holding another channel on as also described above). On the highway or street, however, when control has been by the numerical speed-limit Channels, the Dropout Channel is turned on via a signal from the Dropout Transmitter Device 194, as the vehicle moves from a controlled area into an uncontrolled area, as described below.

B. "Interstate Highway" Driving: (70 MPH Illustration)

"Interstate Highway" situations illustrate particular factors. For example, the numerically designated speed limit on many and perhaps most Interstate Highways is 70 MPH. Moreover, power sources for roadside signal transmitters may not be readily available for long expanses of Interstate Highways. Many of those highways have "limited access." Further, a driver moving onto an Interstate Highway is usually going to drive a relatively long distance. On such a highway, a driver could conceivably stop the vehicle, turn the ignition "Off," wait for the Holding Circuit Relay 38 to time down, and then restart the vehicle and be under no control (other than the psychological control of the "OBSERVE POSTED SPEED LIMIT" sign 42 of the Dropout Channel); for there might be no 70 MPH transmitter devices on the highway to put him back on the 70 MPH channel, and he could preceed to speed at will, for long distances, with the caution light 42 "On" but with none of the alarms or indicators (112, 120, 124) operative. Keeping this from happening, the Dropout Channel is set for 70 MPH with operativity as follows:

As a driver enters onto an Interstate Highway, a signal from the Dropout Transmitter 194 will be sensed, and it will place the system on the Dropout Channel (which by Resistor 53 as above described is set for 70 MPH), the activation of the controlling Relay K-71 of the Dropout Channel being as follows: The signal from Transmitter 194 gates the Rectifier SCR-70, permitting Coil 198 of Relay K-70 to be energized, closing relay contacts 200, energizing line 202, thus energizing all Muting Relays (K32 and K42) other than K72; and the energization of Muting Relay K32 causes blade 89 to move to energize the gate circuit 27 by circuit 34b, thereby imparting a gate (28) signal which actuates the Switch SCS-70, actuating the Relay K71, which de-energizes Relay K70 by opening the contacts 55 of line 34a but closes the relay-controlled contacts 48 in the Transistor Base Circuit 50 to make that alarm-control circuit responsive to the 70 MPH Resistor 53.

Now, even if a driver turns "Off" the ignition long enough that the Holding Circuit Relay 38 has timed down, the only channel that can be turned on by the ignition key (until another numerical speed signal is received) is the Dropout Channel; for no signal will be received from any other numerical-limit-designating Transmitters (66 or 136) which would provide a gate signal (to gates 68 or 138, respectively of Switches SCR 30 or SCR 40) which would achieve a change of Channels. Since this Dropout Channel is set for 70 MPH, the driver therefore would still be controlled at 70 MPH. No matter how many times he turned the ignition "Off," or how long he kept it off, he would still be controlled at 70 MPH.

IX. Installation of Additional Channels

Any number of additional channels can be added to the system, as may be desired for more closely specified speed control, or numerically controlling speeds higher than here shown numerically controlled. If additional channels are to be added, the SCS gate lead line from one channel (line 156 for example), will be disconnected from its present SCS gate, and connected to the gate circuit of the SCS Switch of the added channel, and channel-muting supply lines (like 74, 144, and 202) will be provided in parallel to all of the muting relays of the other channels.

In adding channels, it will be recalled that the speed alert system is shown as what might be referred to as a closed loop system, That is, each channel is turned to an "On" condition by the muting relay (K72, K32, or K42) in the channel next to it; and the power for energizing its control relay (K71, K31, K41, for example) will be supplied to only one of those relays in any condition of operation, for it is only the non-energized one of the muting relays which will permit the available power to actuate that control relay.

X. Miscellaneous Other Components

A. Diodes 210 in Muting Relay Circuits

Diodes 210 are shown in the parallel branches of each of the Muting Relay Circuits (74, 144, and 202). These block power from one of those circuits from going to another of the Muting Relays (K72, K32, K42), since current can flow only one way in a diode. If these diodes were not in each line, the voltage applied to one Muting Relay would also be applied to all of the other Muting Relays, due to their interconnections between channels.

B. Diodes 212 Across Coils

Diodes 212 are shown as protective devices. In parallel with the associated relay coil, they are used for protection against voltage transients. In this circuitry, the Diodes 212 provide a means of dissipating the stored energy in the coil when the anode voltage is removed from the circuit.

C. Receivers

Each of the channels has its Receiver 214 and and associated Amplifier 216; but these are not shown or described in any detail, for they may be of conventional nature, and except in their co-operation with the other components in providing the overall combination of concepts, they themselves are not part of the inventive concepts. Resistors 218 are shown in the line, to limit the current for gating the Input SCR Rectifiers.

D. Other Resistors

Resistors 220 are selected to operate the indicator lights (42, 88, 160) on the vehicle dashboard at a voltage level below their normal rating, to provide for longer life of bulb; and Resistors 222 are shown in gate circuits (27, 84, and 156) of the SCS Switches to provide the desired gating power, as is also a Resistor 224 in the gate circuit 108 of the Rectifier SCR 20-70 in the alarm circuitry.

XI. General Operational Summary

A. Vehicle Turn On

The driver turns the ignition key to the "On" position. An indicator light 42, located on the dashboard, lights a warning sign "OBSERVE POSTED SPEED LIMIT." The vehicle then moves out into the street.

B. Vehicle Enters Speed Zone: (Example, 30 MPH)

As the vehicle receives a signal from the 30 MPH transmitter 66, the 30 MPH channel is put into control, immediately turning OFF the "OBSERVE POSTED SPEED LIMIT" light 42, and turning ON the "30 MPH" indicator light 88 located on the dashboard. If the vehicle is allowably within the legal speed limit, nothing else will be observed. If, however, the vehicle is over the legal speed limit an External Indicator 112 on the outside of the vehicle and the Audible Alarm 120 inside the vehicle will come ON, and the Elapsed Time Indicator 124 will also come ON at this time; and these will stay locked on.

C. Vehicle Enters 40 MPH Zone

The system in the vehicle will pick up a signal from the 40 MPH Transmitter Device 136, and the 40 MPH Channel will then control, turning OFF the 30 MPH light 88 on the dashboard, and turning ON the 40 MPH Indicator Light 160 located on the dashboard. Nothing else will happen, if the vehicle is not over the allowable 40 MPH speed. Even if the vehicle happens to have been previously speeding in a 30 MPH zone, the indicator components (112, 120, 124) will go OFF; but if the vehicle speed is over the allowable 40 MPH limit, all of those indicator components (112, 120, 124) will stay ON.

D. Muting of Overspeed Indicators 112, 120, 124

In any situation, regardless of what channel has been put into control, the overspeed indicator components (112, 120, 124) can be effectively turned OFF only by one of the following: (1) A depression of the brake pedal 128 sufficient to break the Transistor Base Circuit 50 by opening contacts 132, and to break the Alarm Circuit 60 by opening the contacts 130; but, unless the vehicle-braking is sufficient to lower the vehicle speed below the control speed, these particular de-energizing effects exist only for so long as the brake pedal 128 is depressed; (2) A lowering of the vehicle speed to within the permissable value, by the application of the vehicle's brakes (or in accompaniment with at least a momentary depression of the brake pedal 128); for a depression of the brake pedal 128 is needed to open alarm circuit 60 to de-energize Alarm Relay 110; (3) An entrance of the vehicle into a speed zone permissably higher than the vehicle's speed, which reduces the base drive 50 of the Transistor 52 by the change of the base circuit (50) resistors to one which does not yield base circuit drive at that higher speed, as would be necessary to re-gate the Rectifier SCR 20–70, and with the alarm circuit 60 having been broken at a time when its re-closure is not accompanied by such a re-gating (at 108 by line 107) of the Rectifier SCR 20–70.

E. Channel-Changes May Be Either Upwardly or Downwardly

The system will change channels both ways, from a lower speed zone to a higher speed zone, or vice versa; and regardless of what channel has been previously in control, whenever a new speed zone is encountered, its respective control channel comes into control.

F. Dropout Channel

This channel is used in areas that are not controlled by numerical limits, and in the embodiment shown, is used also in 70 MPH zones. When the vehicle leaves a numerically controlled area, and picks up a signal from a Dropout Transmitter 194, an Indicator Light 42 on the dashboard will flash the "OBSERVE POSTED SPEED LIMIT" sign. Also, the Dropout Channel is also the 70 MPH channel, as for "Interstate Highway" driving. As the vehicle enters onto the Interstate Highway, it will pick up a signal from the Dropout Transmitter Device 194, likewise energizing the Indicator Light 42, and putting into effect a 70 MPH control by the base circuit Resistor 53. Even if the driver stops the vehicle, and turns off the ignition, he will again be on the 70 MPH control, as described above, either by the Holding Relay 38 if still within the time-down period of that relay, or even after such period, because the Dropout Channel is the only channel that is turned on with the ignition key, once the holding circuit Relay 38 has timed down.

G. Warning Channel Operation

The Warning Channel overides all other channels. It can be activated from a Transmitter 228 along the street or highway, or from a police patrol car or other specially equipped vehicle. When the Warning Channel is activated, the External Indicator 112 will go into a blinking condition, regardless of the speed of the vehicle. The Audible Alarm 120 will also come ON at this time. This channel may be turned OFF by a Mute Switch 188, located on the dashboard, and operable by the driver. However, the Warning Channel will not stay OFF until the driver is away from the area of the accident, or out of the area of warning area. The Elapsed Time Indicator 124, which in other situations is energized concurrently with indicators 112 and 120, does not come ON when it is the Warning Channel which is activated (assuming that the vehicle is not then speeding which would have energized the Elapsed Time Indicator 124 and which Indicator 124 will remain ON during the continuation of speeding even though the Warning Channel happens to concurrently be activated). Warning Channel activation does not energize the other channels' Muting Relays (K72, K32, and K42).

H. Holding Circuit

When the Vehicle is turned OFF, a Time Delay Relay 38 holds the system on its then-in-control channel for a fixed length of time. Then when the Holding Relay 38 has timed down, the system will be on the Dropout Channel.

I. Always One and Only One Channel is in Control

Except for the Warning channel being at times additionally actuated with the effects stated above, one and only one of the control channels will be in control.

XII. Conclusion

It is thus seen from the foregoing description, according to this embodiment which illustrates the inventive concepts and their operativity, considered with the accompanying schematic drawings, that the present invention provides a new and useful speed alert and control system for regulating vehicular travel, and that the concepts of the invention provide a regulatory system having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific form or arrangement of parts herein described or shown.

What is claimed is:

1. A vehicle speed regulation and control system comprising:

transmitting means apart from said vehicle for transmitting a plurality of signals each designating a certain maximum vehicle speed limit;

receiving means carried by the vehicle for receiving each of said signals;

an overspeed control means carried by the vehicle;

signal-responsive means carried by the vehicle, and responsive to the said receiving means receiving any of said signals, and contributing to the operative actuation of said overspeed control means by designating the value of the vehicle speed at which said overspeed control means are operatively actuated; and speed-responsive means carried by the vehicle and responsive to the vehicle's speed, and also contributing to the operative actuation of said overspeed control means, by designating to the said overspeed control means the vehicle speed; the signal-responsive means being such that when a signal from an outside transmitter is sensed, that signal de-activates all other channels and causes the actuation of the particular channel for which that signal is associated and de-activates the input to that particular channel, and the system is immediately thereafter ready to accept a control signal for actuation of a different channel, but until such a different speed-control signal is received, the particular channel which is then in actuation is maintained actuated without any need of a continuation or repetition of that input signal.

2. The invention as set forth in claim 1 in a combination in which there are also provided visible speed limit indicator means, and the said signal-responsive means also operatively actuates said speed-limit indicator means to indicate speed limit information relating to only what speed limit value information was last transmitted by the transmitting means.

3. The invention as set forth in claim 1 in a combination in which means are provided for maintaining the said signal-responsive means operatively at a certain output designation, once a certain speed limit value signal is transmitted by said transmitting means, unless and until a different speed limit value signal is transmitted by the transmitting means.

4. The invention as set forth in claim 1 in a combination including a plurality of switch means each operatively responsive to the receiving of a certain speed limit signal and which also contribute to the operative actuation of said overspeed control means with reference to that certain speed limit.

5. The invention as set forth in claim 2 in a combination in which a plurality of switch means are provided, each of which is operatively responsive to the receiving of a certain speed limit signal by said receiving means, and is operative to effect the energization of an associated one of the speed-limit indicator means and is also contributory to the operative actuation of said overspeed control means with reference to that certain speed limit.

6. The invention as set forth in claim 2 in a combination in which the one of said visible speed limit indicator means actuated by the highest speed limit signal is an indicator means which does not specify any certain numerical speed limit value, and there are means which provide that if the vehicle-carried components of the system are operatively de-energized it will be that particular indicator means which will be operatively actuated upon reenergizing the said vehicle-carried components of the system.

7. The invention as set forth in claim 3 in a combination in which time-period means are also provided which maintain said signal-responsive means at a certain output-designation, once a certain speed limit value signal is transmitted by said transmitting means, for a time period following de-energization of the vehicle-carried components of the system.

8. The invention as set forth in claim 1 in a combination in which a plurality of relay means are provided, all except one of which is operatively energized by the receiving of any certain speed limit signal by said receiving means, and the energization of each of which is operative to block energization of associated means contributory to the operative actuation of the said overspeed control means, at a certain value-designation, but is also operative to operatively energize other associated means which are operative to contribute to the operative actuation of the said overspeed control means at a different value-designation.

9. The invention as set forth in claim 8 in a combination in which a plurality of means are provided for the designation of different values of operative actuation of the overspeed control means, and overspeed indicator means are provided, and the energization of each of said relay means is also operative to block energization of said overspeed indicator means by circuitry other than that associated with a certain one of the means for the designation of a certain value-designation of the overspeed control means.

10 The invention as set forth in claim 1 in a combination in which the said overspeed control means includes overspeed indicator means which includes a first control circuit means including a calibratable circuit and operatively energized by the said speed-responsive means designation of a vehicle speed operative to contribute to the operative actuation of the overspeed control means at a value operatively designated by the said signal-responsive means, a second circuit means operatively energized upon energization of said first control circuit means, and an overspeed indicator circuit means energized upon energization of said second control circuit means.

11. The invention as set forth in claim 1 in a combination in which said vehicle includes a manually operable vehicle-braking means, there being a switch means provided in cooperative association with said braking means, and said switch means and associated circuitry being such as to de-energize said overspeed control means if said vehicle-braking means is being actuated even if said speed-responsive means is designating a speed otherwise sufficient to contribute to the operative actuation of said overspeed control at the value-designation then designated by said signal-responsive means.

12. The invention as set forth in claim 1 in a combination in which the overspeed control means includes warning indicator means which are operatively energized only when the vehicle speed as designated by the said speed-responsive means is at or in excess of the speed value designated by said signal-responsive means.

13. The invention as set forth in claim 12 in a combination in which the said warning indicator means are operative in a first condition when energized as aforesaid but have a second condition of operation, and circuitry is provided which causes said warning indicator means to be in said second condition of operation, the said transmitting means and the said receiving means including means for energizing said circuitry causing the said second condition of operation regardless of whether or not the said warning indicator means are being at that time energized to be in said first condition of operation.

14. The invention as set forth in claim 1 in a combination in which the said overspeed control means includes time means which records the time periods in which the vehicle has been travelling at a speed designated by said speed-responsive means which is at or in excess of the speed value designated by said signal-responsive means.

15. The invention as set forth in claim 1 in a combination in which the said signal-responsive means include a first circuit means and a second circuit means, the said first circuit means being operatively set to be energized by the reception of a signal by the said receiving means, and when energized energizes means which actuates the said second circuit means to be in energized condition, the said second circuit means in said energized condition being operative to do the said contributing to the operative actuation of the said overspeed control means and also to de-energize said first circuit means.

16. The invention as set forth in claim 15 in a combination in which there is provided also an overspeed indicator circuit means, and the energization of the said second circuit means also energizes said overspeed indicator circuit means.

17. The invention as set forth in claim 15 in a combination in which the de-energization of said first circuit means removes the means which actuates the said second circuit means to be in energized condition but the said second circuit means is operative nevertheless to remain in energized condition.

18. The invention as set forth in claim 17 in a combination in which the said receiving means are operative, when a different speed limit signal is received from said transmitting means, to energize a first circuit means associated with control by said different speed limit signal, which is operative to de-energize the said second circuit means which as aforesaid had nevertheless remained in energized condition.

19. The invention as set forth in claim 1 in a combination in which the said overspeed control means includes a transistor means which is calibratable to any associated electric signal and which is energized by the speed-responsive means when the vehicle attains the speed designated by the said signal-responsive means.

20. The invention as set fort in claim 19 in a combination in which there is provided overspeed indicator means, and the energization of the said transistor means energizes said overspeed indicator means.

21. The invention as set forth in claim 3 in a combination in which the said maintaining means includes a time delay relay means.

22. The invention as set forth in claim 6 in a combination in which the said providing means include a circuit which is operatively connected to the vehicle ignition in a manner such that the said last named circuit is energized by turning the ignition to the "On" position, and that said circuit operatively energizes the said one of the visible speed limit indicator means.

23. The invention as set forth in claim 7 in a combination in which there are provided speed limit indicators, one of which is of a generalized nature not indicating any specific numerical value of speed limit, and means are also provided which, after said de-energization for said time period, provide that subsequent energization of said vehicle-carried components will operatively energize that said one of the speed limit indicators, and provide also that it will remain operatively energized unless and until a different speed limit value signal is transmitted by the transmitting means.

24. The invention as set forth in claim 8 in a combination in which there is provided one of said relay means for each speed limit to which the signal-responsive means is responsive, and each of the said relay means energizes a signal-responsive means associated with the designation of a certain one speed limit and de-energizes the signal-responsive means associated with the designation of a certain other speed limit.

25. The invention as set forth in claim 10 in a combination in which the said second circuit means includes a transistor means, the energization of which energizes the said second circuit means.

26. The invention as set forth in claim 25 in a combination in which the said second circuit means also includes a relay means which, when the transistor means is energized energizing the second circuit means, energizes the said overspeed indicator circuit means.

27. The invention as set forth in claim 13 in a combination in which the said last-named circuitry includes relay means which: (a) blocks energization of the warning indicator means from being energized by the energization means which are operative to achieve said first condition of operation, and which (b) energizes said warning indicator means by energization which achieves said second condition of operation.

28. A warning system for a vehicle, comprising:
transmitting means apart from said vehicle for transmitting a signal having a spatially limited range;
receiving means carried by the vehicle and having a low sensitivity and high selectivity to operatively sense said signal when said vehicle is within the said spatially limited range of said transmitting means;
indicator means carried by the vehicle;
energizing means actuated by said receiving means for energizing said indicator means upon receiving a signal from said receiving means;
operator-operable means for operatively muting the said indicator means, the said operator-operable means being a switch means of normally closed type which permits energization of said indicator means by said energizing means;
the arrangement being such that the said indicator means will not be de-energized by the passing of said vehicle out of said spatially limited range except upon the operation of said operator-operable muting means muting said indicator means at a location of the vehicle outside said spatially limited range.

29. The invention as set forth in claim 1 in a combination in which the regulation and control system includes a warning system comprising:

transmitting means apart from said vehicle for transmitting a signal having a spatially limited range;

receiving means carried by the vehicle and having a low sensitivity and high selectivity to operatively sense said signal when said vehicle is within the said spacially-limited range of said transmitting means;

indicator means carried by the vehicle;

energizing means actuated by said receiving means for energizing said indicator means upon receiving a signal from said receiving means;

operator-operable means for operatively muting the said indicator means, the said operator-operable means being a switch means of normally closed type which permits energization of said indicator means by said energizing means;

the arrangement being such that the said indicator means will not be de-energized by the passing of said vehicle out of said spatially limited range except upon the operation of said operator-operable muting means muting said indicator means at a location of the vehicle outside said spatially limited range.

* * * * *

UNITED STATES PATENT OFFICE
CERTIFICATE OF CORRECTION

Patent No. 3,686,628     Dated    August 22, 1972

Inventor(s) Arthur E. Keller

It is certified that error appears in the above-identified patent and that said Letters Patent are hereby corrected as shown below:

On the cover sheet [72], delete "Claude W. Earles, 1013 E. Buchanan St., Plainfield, Ind. 46168" .

Signed and sealed this 8th day of May 1973.

(SEAL)
Attest:

EDWARD M.FLETCHER,JR.
Attesting Officer

ROBERT GOTTSCHALK
Commissioner of Patents